(12) United States Patent
Tunnell et al.

(10) Patent No.: US 11,345,774 B2
(45) Date of Patent: May 31, 2022

(54) FREE-FLOWING POLYMER COMPOSITION

(71) Applicant: KRATON POLYMERS LLC, Houston, TX (US)

(72) Inventors: John G. Tunnell, Belpre, OH (US); Aaron Brothers, Houston, TX (US); Kathryn J Wright, Houston, TX (US); Robert C Bening, Houston, TX (US)

(73) Assignee: KRATON POLYMERS LLC, Houston, TX (US)

( * ) Notice: Subject to any disclaimer, the term of this patent is extended or adjusted under 35 U.S.C. 154(b) by 0 days.

(21) Appl. No.: 16/556,713

(22) Filed: Aug. 30, 2019

(65) Prior Publication Data

US 2020/0079891 A1  Mar. 12, 2020

Related U.S. Application Data

(60) Provisional application No. 62/727,596, filed on Sep. 6, 2018.

(51) Int. Cl.
  *C08F 297/08* (2006.01)
  *C08K 3/36* (2006.01)

(52) U.S. Cl.
  CPC ...... *C08F 297/086* (2013.01); *C08F 297/083* (2013.01); *C08K 3/36* (2013.01); *C08K 2201/006* (2013.01)

(58) Field of Classification Search
  CPC .... C08F 297/086; C08F 297/083; C08K 3/36; C08K 2201/006; C08L 101/005
  See application file for complete search history.

(56) References Cited

U.S. PATENT DOCUMENTS

| | | | |
|---|---|---|---|
| 3,595,942 A | 7/1971 | Wald et al. | |
| 3,634,549 A | 1/1972 | Shaw et al. | |
| 3,670,054 A | 6/1972 | De La Mare et al. | |
| 3,700,633 A | 10/1972 | Wald et al. | |
| 5,360,350 A * | 11/1994 | Koblitz | H01R 4/70 439/276 |
| 5,837,769 A | 11/1998 | Graafland et al. | |
| 2003/0125442 A1* | 7/2003 | Maris | C08L 53/02 524/474 |
| 2006/0205849 A1* | 9/2006 | St. Clair | C08F 297/044 524/286 |
| 2007/0225428 A1* | 9/2007 | Bening | C08L 53/02 524/505 |
| 2008/0015306 A1* | 1/2008 | Wright | C08L 53/025 524/572 |
| 2010/0179276 A1* | 7/2010 | Meyer | C09J 11/04 524/548 |
| 2015/0219796 A1* | 8/2015 | Salazar | G02B 1/046 385/109 |

OTHER PUBLICATIONS

Kraton; Kraton® Polymers for Oil Modification, 2016, p. 1-8.*
Shell; Kraton® Thermoplastic Rubbert in oil gels, 1989, p. 1-9.*
Evonik; Aerosil® Fumed Silica Technical Overview, 2015, p. 1-103.*

* cited by examiner

*Primary Examiner* — Robert S Jones, Jr.

(57) ABSTRACT

A block copolymer composition is disclosed. The composition contains an elastomeric block copolymer and a hydrophilic fumed silica with a surface area (BET, measured by nitrogen gas adsorption) of at least 200 m²/g, and a pH of 3 to 5, a tamped density of <=75 g/L. The block copolymer composition forms free-flowing composition, requiring less than 400 lbs/ft² to break in a blocking test. The free-flowing composition does not negatively impact haze, transparency, and yellowness of transparent compounds, suitable for use in transparent formulations for medical, toys, and overmolds, viscosified oils, and oil gels applications.

20 Claims, No Drawings

FREE-FLOWING POLYMER COMPOSITION

RELATED APPLICATIONS

This application claims priority from U.S. Provisional Application No. 62/727,596, with a filing date of Sep. 6, 2018, the entire disclosures of which is incorporated herein by reference for all purposes.

FIELD

This disclosure relates to a free-flowing composition which contains an elastomeric block copolymer.

BACKGROUND

Some thermoplastic elastomers show a high cohesive strength, resulting in granulate or crumb of the composition agglomerate forming large clumps of granules, when the product is kept on stock, for example when stacked up in sacks, bags, Gaylords, cartons, or kept in a silo. It is even possible that an entire sack, bag, Gaylord, carton, or silo is filled with a mass of granules all or virtually all agglomerated into a single mass. Once the granulate agglomerates together, it has to be broken up with force to transport the granulate into the feed opening of relevant processing equipment such as a mixer or an extruder. U.S. Pat. No. 5,837,769 provides a free-flowing elastomer powder with the addition of "significant amounts" of a plasticizing oil.

There is a need for an improved free-flowing elastomer composition with solid flow characteristics, and particularly for use in applications with low haze.

SUMMARY

In one aspect, a free-flowing diblock block copolymer composition requiring less than 400 lbs/ft2 to break in a blocking test is provided. The free-flowing block copolymer composition comprises: (i) 0.2 to 2.0 wt % of a fumed silica with a tamped density of <75 g/L, a surface area (BET, measured by nitrogen gas adsorption) of at least 200 m2/g, and a pH of 3 to 5; and (ii) 98.0 to 99.2 wt. % of a block copolymer comprising any of: a) a tetra-branched block copolymer having a molecular weight of 100,000 to 800,000 represented by the general formula $(A-B)_4X$; b) a triblock copolymer having linear or radial structure represented by the general formula $(A-B)_3X$, n=2 to 6, and having a molecular weight of 75,000 to 600,000; c) a linear diblock copolymer having a molecular weight of 25,000 to 250,000 represented by the general formula A-B; and d) combinations thereof; wherein: i) A represents a polymer block of a mono alkenyl arene; ii) B represents a polymer block of a conjugated diene; iii) X represents the residue of a coupling agent.

In one aspect, the block copolymer is a triblock copolymer having a coupled structure represented by the general formula $(A-B)_2X$, and a molecular weight of 50,000 to 400,000.

In one aspect, a free-flowing diblock block copolymer composition is provided. The free-flowing block copolymer composition comprises: (i) from 98.0 to 99.2 wt. % of a diblock copolymer comprising one block of a monovinylaromatic hydrocarbon and one block of a conjugated diene having a styrene equivalent peak molecular weight from 80,000 g/mole to 250,000 g/mole, a vinyl content from 5 to 80 mol % based on the number of repeat monomer units in the conjugated diene block, a polystyrene content from 20 wt. % to 55 wt. %; and (ii) 0.2 to 2.0 wt % of a hydrophilic fumed silica with a tamped density of <75 g/L, a surface area (BET, measured by nitrogen gas adsorption) of at least 200 m2/g, and a pH of 3 to 5. The free-flowing block composition requires less than 400 lbs/ft2 to break in a blocking test. In one embodiment, 20% to 95% of the repeat units in the conjugated diene block resulting from 1.4 addition of the diene monomer. In another embodiment, the vinyl content ranges from 25 to 80 mol %. In embodiments, the diblock copolymer is selectively hydrogenated.

In another aspect, a free-flowing copolymer composition is provided. The free-flowing copolymer composition comprises: (i) from 98.0 to 99.2 wt. % of a triblock copolymer having at least two blocks of monovinylaromatic hydrocarbon and at least one block of conjugated diene, the triblock copolymer is selected from the group consisting of linear or radial triblock copolymers having a sequential A-B-A or coupled $(A-B)_nX$ structure, n is an integer from 2 to 6 and X is the residue of a coupling agent, with a styrene equivalent peak molecular weight from 80,000 g/mole to 500,000 g/mole, a vinyl content from 5 to 80 mol. % based on the number of repeat monomer units in the conjugated diene block, a polystyrene content from 10% to 40%, and (ii) 0.2 to 2.0 wt. % of hydrophilic fumed silica with a tamped density of <75 g/L, a surface area (BET, measured by nitrogen gas adsorption) of at least 200 m2/g, and a pH of 3 to 5. The triblock copolymer has a melt index from <1 g/10 min. to 5 g/10 min. as determined by ASTM D-1238, condition G (200° C., 5 kg). The free-flowing copolymer composition requires less than 400 lbs/ft2 to break in a blocking test.

In one embodiment, the triblock copolymer is a radial triblock copolymer having a $(A-B)_2X$ structure, wherein the styrene equivalent peak molecular weight of $(A-B)_2$ is 1.5 to 2.5 times the styrene equivalent peak molecular weight of a $(A-B)_1$ diblock copolymer.

DESCRIPTION

The following terms used in the specification have the following meanings:

"Molecular weight" in the context of block copolymers refers to the apparent molecular weight, or the number average molecular weight (Mn) of the block copolymer, as measured with gel permeation chromatography (GPC) using polystyrene calibration standards (using a method analogous to the method described in ASTM D5296-05). The "number average molecular weight" is also referred to as "styrene equivalent molecular weight", or "apparent molecular weight". The molecular weights measured at the peak of the GPC trace are commonly referred to as "styrene equivalent peak molecular weights". The peak position is used, since the differences between the peak molecular weight ($M_p$) and the number average molecular weight are generally very small. The styrene equivalent molecular weight may be converted to "true molecular weight" when the styrene content of the polymer and the vinyl content of the diene segments are known.

The molecular weights of the individual blocks are determined by difference. The molecular weight of the C block ($M_C$) is measured after its polymerization, then the molecular weight of the C-A diblock ($M_{CA}$) is measured after its polymerization, and so on. For example, by measuring the styrene equivalent molecular weight of the C block and the CA block, the styrene equivalent molecular weight of the A block is given by, $M_A=M_{CA}-M_C$. This $M_A$ value can then be converted to the true molecular weight using the conversion method mentioned above. Alternately, the true molecular weights of each homopolymer block, diblock, triblock, etc. can be first determined by conversion of the styrene equivalent molecular weights as discussed above, and then the true molecular weight of each block determined by difference. The first method is preferred. Unless otherwise specified, the term "molecular weights" refers to the true molecular weight in g/mol of the polymer or block of the copolymer.

"Vinyl" refers to the presence of a pendant vinyl group on the polymer chain.

"Vinyl content" is used to describe a polymer that is made when the conjugated diene 1,3 butadiene is polymerized via 1,2-addition (and isoprene via a 3,4-addition), resulting in a pendant olefin, or vinyl group, adjacent to the polymer backbone.

"Crumb" refers to the particle comprising the block copolymer, as it is coagulated from the solvent rather than a ground, fine particle size material. The particle size of the crumb is larger than 2 μm and less than 2000 μm, or from 500 to 2000 μm (35 mesh screen), or from 300 to 2000 μm, or larger than 5 μm, or between 100 and 700 μm, or between 150 and 600 μm.

"Free-flowing" means a composition requiring a force of less than 400 lbs/ft$^2$ to break in a blocking test. In some embodiments, the force required is less than 300 lbs/ft$^2$.

"Block cylinder" refers to a cylinder having an internal diameter of 61 mm, a length of 128 mm, that can be opened along the side(s) as well as the top and bottom.

"Blocking test" refers to a test in which the block cylinder is filled with crumbs with a length of approximately ⅔ to full. Weights of approximately 5.0 lbs are placed onto each crumb inside the block cylinder. The assembly is placed in an oven at a temperature of 110° F. (43° C.). After 7 days, the cylinder is removed from the oven and weight is removed. Both top and bottom of the cylinder are removed, and the cylinder is opened at the side. The sample (of crumbs) is placed onto a test holder as a block for observation and further testing. Weight can be slowly added on top of the sample block until the sample block collapses into crumb. Some samples may crumble immediately into free-flowing crumbs as they are removed from the cylinder and placed onto the test holder, some may crumble on the outside but can still be fused together in a core center requiring some force to break the fused core, and some stay as a block that would need force or weight to break the sample block into free-flowing crumbs.

"Force to break" (in blocking test) refers to the force in lbs/ft$^2$ required to break the sample block of aggregated crumbs as placed onto the test holder.

"Jenike Bulletin 123" refers to work by Dr. Andew W. Jenike, dated November 1964, University of Utah, available at https://www.osti.gov/servlets/purl/5240257. The tests incorporating the Jenike design can be carried out according to ASTM D-6128-16.

"Conical opening for mass flow" refers to tests carried out according to Jenike Bulletin 123 to design hoppers with the appropriate opening for free-flowing of material (zero hold time and at 72° F.). In the mass flow test, all of the material in a hopper is in motion, although not all with the same velocity. The smaller the design (theoretical) hopper cone opening is required for free-flowing, the easier the material is to handle (more free-flowing).

"Conical opening for funnel flow" refers to another test according to the Jenike Bulletin 123. In the funnel flow, only a core of the material in the center above the hopper outlet (opening) is in motion while the material next to the wall is stationary. As with the mass flow test, the smaller the design hopper cone opening is required, the more free-flowing the material is.

"Conical hopper angle for mass flow" refers to another test according to Jenike Bulletin 123 using a Jenike Shear Tester, wherein the hopper angle to ensure mass flow is determined. Material flows easier with a more shallow the cone hopper. A material is free flowing if the design or required angle from vertical for a conical hopper angle is less than 15°.

"Block copolymer" refers to a block copolymer comprising at least one poly(monovinyl aromatic hydrocarbon) block and at least one hydrogenated or unhydrogenated poly(conjugated diene) block.

The disclosure relates to a composition of free-flowing styrenic block copolymer crumbs with free-flowing characteristics, and low haze properties for use in oil field chemicals, gel, and general purpose overmolding, molded and extruded applications. The block copolymer crumb is coated with a silica dust after dehydration/drying treatment prior to being transferred to packing in sacks, bags, Gaylords, cartons, or kept in a silo.

Block Copolymer: The styrenic block copolymer ("SBC") can have a linear, radial or star-shaped structure, e.g., a styrenic diblock copolymer of formula A-B, or a linear triblock copolymer of formula A-B-A, and/or a multi-arm coupled block copolymer of formula $(A-B)_nX$, where A is a monoalkenyl arene block, B is a conjugated diene block, n is an integer from 2 to 6, and X is the residue of a coupling agent, and mixtures thereof.

In one embodiment, the SBC is a linear block copolymer comprising two poly(monovinyl aromatic hydrocarbon) endblocks and one poly(conjugated diene) midblock. In one embodiment, the SBC comprises a diblock copolymer of the A-B structure where A is poly(monovinyl aromatic hydrocarbon) and B is a poly(conjugated diene). The diblock copolymer in on embodiment has a styrene equivalent peak molecular weight from 80,000 g/mole to 250,000 g/mole, a vinyl content from 5 to 80 mol % based on the number of repeat monomer units in the conjugated diene block, and a polystyrene content from 20 w % to 55 w %.

In another embodiment, the SBC is a triblock copolymer A-B-A, based on styrene (A block), with the "B" block being a rubber (e.g., butadiene, isoprene. etc.) or hydrogenated rubber (e.g., ethylene/propylene or ethylene/butylene or ethylene/ethylene/propylene). In yet another embodiment, the SBC comprises mixtures of different block copolymers may be used, for instance an AB/ABA block copolymer mixture with A and B as defined above. In one embodiment, the SBC is a triblock having any of the structures: styrene ethylene propylene styrene (SEPS), styrene ethylene butylene styrene (SEBS), and styrene ethylene ethylene propylene styrene (SEEPS), of the structure A-B-A or $(A-B)_nX$ where X is the remnant of a coupling agent and n=2 to 6. The triblock copolymer has a styrene equivalent peak molecular weight from 70,000 g/mole to 600,000 g/mole, a vinyl content from 5 to 80 mole percent based on the number of repeat monomer units in the conjugated diene block, a polystyrene content from 10% to 40%, and a melt index from 0.1 g/10 min. to 5 g/10 min (ASTM D-1238, condition G (200° C., 5 kg).

In some embodiments, the triblock or radial SBC block copolymer is characterized as having at least 10 wt. % polystyrene content (PSC), preferably 20 wt. % to 40 wt. %. In embodiments, the triblock has a structure $(A-B)_2X$ molecular weight of at least 50 kg/mol, preferably 50 kg/mol to 500 kg/mol, In one embodiment, the SBC is a radial block copolymer of the general formula: $(AB)_n(B)_mX$, wherein A is a poly (monovinyl aromatic hydrocarbon) block, B is a poly(conjugated diene) block, X is a coupling agent residue and n and m are integers of from 0 to 30. Polymer blocks A and B may contain small amounts, e.g. up to 20% by weight but preferably less than 10% by weight based on the total weight of the block copolymer, of one or more other monomers which are copolymerizable with the said main monomer.

In embodiments, the SBC is a selectively hydrogenated isoprene-styrene block copolymer having a structure S-EP with at least 25 wt. % polystyrene content (PSC), preferably 28 to 50 wt. % polystyrene content, a polystyrene block true molecular weight of at least 30 kg/mole, and a total diblock apparent molecular weight of at least 100 kg/mole, or 100 to 250 kg/mol, or 150 to 250 kg/mol, or 200-250 kg/mol.

In some embodiments, the SBC is characterized as having a polystyrene block S with a true molecular weight in the range of 30 to 110 kg/mole, 65 to 105 kg/mole, 70 to 100 kg/mole, 85-95 kg/mole, or 65-75 kg/mole.

In embodiments, the polyisoprene block (EP) has a true molecular weight in the range of 50-100 kg/mole, 85-95 kg/mole, at least 80 kg/mole, or 90-110 kg/mole.

In embodiments, the polystyrene content is from 10 to 40 wt %, or 15 to 35 wt. %.

In embodiments, the butylene monomer unit B in the ethylene/butylene copolymer block is high with respect to 100 mol % of monomer units constituting the hydrogenated vinyl aromatic copolymer, e.g., at least 30 mol %, or at least 45 mol %, or at least 60 mol %.

In embodiments, the degree of hydrogenation of unsaturated groups in the conjugated diene compound monomer unit is at least 70 mol %, or at least 80 mol %, or at least 90 mol %.

The apparent molecular weight of the block copolymer can vary over a broad range and suitably lies within the range of from 25,000 to 1,000,000, preferably 50,000 to 500,000. In the event of branched or star-shaped block copolymers the apparent molecular weight may even exceed 1,000,000.

Dusting Agent: The block copolymer crumbs are coated with a dusting agent in an amount from 0.02 to 2 wt. % (based on the total weight of the crumbs), preferably at least 0.1 wt. %, and most preferably from 0.2 to 0.8 wt. %. In embodiments, the dusting agent is a fumed silica with a surface area (BET, measured by nitrogen gas adsorption) in the range of 175-500 $m^2/g$, preferably at least 225 $m^2/g$; most preferably 275-450 $m^2/g$; pH value in the range of 3 to 5, preferably 3.4 to 4.5; specific gravity of 2.0 to 2.4 $g/cm^3$ at 20° C., or at least 2.0/$cm^3$ at 20° C.; and tamped density ranging from 40 to 75 g/L; or at least 40 g/L, or at least 50 g/L. In embodiments, the fumed silica is hydrophilic.

In one embodiment, in addition to fused silica powders described above, the dusting agent can further comprise up to 500 phr, or 50 to 300 phr, or 100 to 250 phr, of a filler, e.g., calcium carbonate, aluminum silicate, clays, talcs, and the like, based on 100 parts of fused silica (i.e., parts per hundred parts or phr).

Optional Components: In addition to the components described above, other conventional ingredients such as antioxidants, fillers, UV stabilizers, slipping agents, flame retarders, blowing agents, antistatic agent, and the like may be present as well. Such ingredients are only present in small quantities, e.g. up to 2 wt. % based on the total weight of the SBC composition. Some filler materials can be present in larger quantities than 2 wt. %.

Method for Making: The SBC composition can be prepared by contacting the monomer or monomers with an organoalkali metal compound in a suitable solvent at a temperature range of from −150° to 300° C., preferably at a temperature range of 0 to 100° C. Selective hydrogenation can be carried out under conditions such that at least 90 mol %, or at least 95%, or at least 98% of the isoprene double bonds have been reduced, and between 0 and 10 mol % of the arene double bonds present in the polymerized styrene units have been reduced. The methods operate to hydrogenate polymers containing aromatic or ethylenic unsaturation and are based upon operation of a suitable catalyst, based on nickel, cobalt or titanium. Hydrogenation processes are disclosed, for example, in U.S. Pat. Nos. 3,595,942; 3,634,549; 3,670,054; and 3,700,633; the relevant portions of which are incorporated herein by reference.

After hydrogenation, in the solvent removal step, solvent is removed from the solution containing the polymer by known methods including steam stripping or direct solvent removal, resulting in a water-wet slurry containing less than 0.2 wt. % solvent; or less than 0.05 wt. %, or less than 0.01 wt. % solvent.

In the next crumbing step, the slurry is subject to dehydration/drying to generate crumbs having a pre-determined moisture content, e.g., from 1 to 25 wt. %, or from 2 to 20 wt. %, or from 3 to 15 wt. %, in equipment known in the art such as kneader-type dryer, a screw-type expander dryer, and the like, with the discharge port of the dehydration treatment be kept at a temperature of 110-175° C.

The dusting can be done in any of batch, semi-batch, and continuous basis. Dusting can be done batch-wise or semi-batch-wise by mixing in suitable equipment, with the dusting agent being added in an amount for the crumb to be sufficiently coated with the dusting agent for a free-flowing property, while still giving a haze free composition. In a continuous mode, right after the crumbs are discharged from the dehydration apparatus, the dusting agent is added to the dehydrated crumbs in a feed port prior to feeding to a conveying belt by means of vacuum or forced air, for transport to the next packing step.

Properties: The composition is free-flowing for ease of handling. Reliable handling of bulk solids is critical in operation. If the product becomes more difficult flowing after storage, segregates, and floods or degrades, reliable bin and hopper design is a factor in your continuing production, including characterization of material flow properties prior to placing in a storage bin. Material flow properties to consider include cohesive properties, wall friction properties, and compressibility.

In embodiments, the composition is characterized as free flowing for conical opening in a funnel flow test (according to ASTM D-6128-16 and Jenike Bulletin 123) of less than 10 ft, or a conical opening in a mass flow test of less than 3 ft. In embodiments, the composition is characterized as free flowing for conical hopper angle of less than 15 degrees from vertical.

In embodiments, the SBC composition dusted with hydrophilic fumed silica is characterized as free-flowing, with more than 80 vol. % of the crumbs comprising the block copolymer do not adhere to one another. The free-flowing SBC composition requires less than 400 lbs/$ft^2$ to break in a blocking test. In some embodiments, the free-flowing SBC composition requires less than 300 lbs/$ft^2$ to break in a blocking test. In some embodiments, the SBC composition requires essentially no force to break in a blocking test.

In addition to excellent flow properties, for applications such as oil gels, molded and extruded compounds, the composition incorporating the free-flowing SBC composition in an amount of over 30 wt. % (based on total weight of polymers in the compound) still exhibits excellent optical property with haze less than 15%, and delta yellow index YI of less than 8 when injection molded at 2 mm thickness. In gel applications, the dust agent has little if any negative impact on the effective yield stress (shear stress at 0.1 s−1 in Pa), when mixed at ambient or elevated temperature. In one embodiment of an oil gel with 5-15 wt. % of the free-flowing composition, the oil gel has a shear stress at 77° F. of at least 3 Pa.

Applications: As the free-flowing powder does not negatively impact haze, transparency, and yellowness of transparent compounds, the free-flowing composition is suitable for use in transparent formulations for medical, toys, and overmolds, and oil gels applications. In one embodiment of an oil gel, the oil gel comprises 3-15 wt. % of the free-flowing composition based on 100 wt. % total composition of the oil gel, and wherein the oil gel has a shear stress at 77° F. of at least 3.

EXAMPLES

The invention is further illustrated by the following examples. The following components were used in the examples.

SBC1 is a clear, linear triblock copolymer based on styrene and ethylene/butylene S-E/B-S with a diblock content <1%, a PSC of 33%, a styrene/rubber ratio of 33/67, Shore A (10 sec) hardness of 52, tensile strength of >17 MPa (ASTM D412), 300% modulus of 4.3 MPa, melt index (200° C., 5 kg) of <1 g/10 min, elongation at break of >800% %, and Tg of rubber block of −38° C.

SBC2 is a clear, linear triblock copolymer S-E/B-S with a diblock content <1%, a PSC of 30%, a styrene/rubber ratio of 30/70, Shore A (10 sec) hardness of 72, tensile strength of 35 MPa (ASTM D412, separation speed 10 in/min), 300% modulus of 5.6 MPa, melt index (200° C., 5 kg) of <1 g/10 min, elongation at break of 500%, and Tg of rubber block of −53° C.

SBC3 is a clear, linear triblock copolymer S-E/B-S with a diblock content <1%, a PSC of 30-33%, a styrene/rubber ratio of 33/67, Shore A (10 sec) hardness of 70, tensile strength of >28 MPa (ASTM D412, separation speed 10 in/min), melt index (200° C., 5 kg) of <1 g/10 min, elongation at break of >800%, and Tg of rubber block of −53° C.

SBC4 is a clear, coupled triblock copolymer $(S-E/B)_nX$, where n is an integer from 2 to 6, and X is the residue of a coupling agent, with a diblock content ≤15%, a PSC of 31-34%, a styrene/rubber ratio of 33/67, Shore A (10 sec) hardness of approximately 70, tensile strength of >24 MPa, melt index (200° C., 5 kg) of <1 g/10 min, elongation at break of >800%, and Tg of rubber block of −53° C.

SBC5 is a clear, diblock copolymer (S-EP) with a PSC of 27.6%, tensile strength of >300 MPa (ASTMD412, measured on film cast on toluene), melt index (at 200° C., 5 kg) of less than 1 g/10 min., and glass transition temperature (Tg) of the rubber block of −55° C.

Dust Agent 1 is a hydrophilic untreated fumed silica with BET surface area of 300±30 $m^2/g$, tamped density (DEIN EN ISO 787/11) of 50 g/l, less than 1.5 wt. % moisture at 105° C., and pH between 3.7 to 4.5, at more than 99.8% $SiO_2$ content.

Dust Agent 2 is another hydrophilic untreated fumed silica having BET surface area of 325 $m^2/g$, pH of 4.0, and less than 1.5% moisture.

Dust Agent 3 is Dust Agent 1 packaged in FIBC tote packaging for a tamped density of 100 g/L.

Examples 1-15

Crumb samples were prepared according to the formulations in Table 1, with and without with the addition of a Dust Agent. The samples were dusted using high shear mixer Henschel for up to 90 seconds to coat or dust the crumbs with a Dust Agent. The crumb samples were submitted to blocking test. The Blocking Test results are also shown in Table 1, with the amount of force required to break the sample block as lbs. per square ft.

Examples 16-20

In a plastic bag, a white mineral oil was added to crumbs prepared in the previous examples in varying amount. The oil is allowed to be absorbed overnight, and other components are added according to the formulations in Table 2. The samples are tumbled in bag before being added into a K-Tron feeder at rate of 14 lbs./hr, extruded on a 25 mm Berstorff with chilled water. The pellets are dried overnight with N2 before molding forming plaques for testing. Optical properties of the plaques are shown in Table 3:

TABLE 2

| Ingredient | phr | Ex. 16 0% | Ex. 17 0.2% DA1 | Ex. 18 0.4% DA1 | Ex. 19 0.5% DA1 | Ex. 20 0.6% DA1 |
| --- | --- | --- | --- | --- | --- | --- |
| SBC2 | 100 | 2.2588 | 2.2586 | 2.2588 | 2.2584 | 2.2588 |
| White mineral oil | 125 | 2.828 | 2.902 | 2.826 | 2.8286 | 2.825 |
| Impact modifier resin | 15 | 0.3398 | 0.3402 | 0.3396 | 0.3394 | 0.3404 |
| Polyproylene | 25 | 0.5654 | 0.5652 | 0.5654 | 0.565 | 0.5652 |
| Phenolic antioxidant | 0.2 | 0.0052 | 0.0052 | 0.0052 | 0.0052 | 0.0052 |
| Thioether antioxidant | 0.5 | 0.011 | 0.0114 | 0.0104 | 0.0112 | 0.011 |
| TOTAL | 265.7 | 6.0078 | 6.0826 | 6.0054 | 6.0078 | 6.0056 |

TABLE 3

| Averages | Ex. 16 Control | Ex. 17 0.2% DA 1 | Ex. 18 0.4% DA 1 | Ex. 19 0.5% DA 1 | Ex. 20 0.6% DA 1 |
| --- | --- | --- | --- | --- | --- |
| Light Transmission (%) | 89.8 | 90.0 | 89.7 | 89.7 | 88.9 |
| Haze (%) | 10.5 | 10.6 | 9.8 | 10.1 | 11.2 |
| Clarity (%) | 94.3 | 91.8 | 94.2 | 94.0 | 93.9 |
| Delta yellowness index (YI) | 7.25 | 7.37 | 7.24 | 6.03 | 5.41 |

As shown in Table 2, SBC2 with varying amounts of dust agent DA1 was compounded with additional ingredients. Additionally, the composition is particularly suitable for transparent formulations, without negatively impacting the haze, transparency, and yellowness of transparent compounds as shown in Table 3.

Examples 20-30

Crumb samples were prepared according to the general procedures in Examples 1-15, and the formulations in Table 4, with and without with the addition of a Dust Agent. The crumb samples were submitted to blocking test. The Blocking Test results are also shown in Table 4.

TABLE 4

|  | 21 | 22 | 23 | 24 | 25 | 26 | 27 | 28 | 29 | 30 |
|---|---|---|---|---|---|---|---|---|---|---|
| SBC4 | 100 | 99.8 | 99.7 | 99.7 | 99.6 | 99.5 | — | — | — | — |
| SBC3 | — | — | — | — | — | — | 100 | 99.8 | 99.7 | 99.7 |
| DA1 | — | 0.2 | 0.3 | — | — | — | — | 0.2 | 0.3 | — |
| DA2 | — | — | — | 0.3 | 0.4 | 0.5 | — | — | — | 0.3 |
| Total | 100. | 100. | 100. | 100. | 100. | 100. | 100. | 100. | 100. | 100. |
| Force lbs/ft2 | 276 | 110 | 0 | 0 | 0 | 0 | 221 | 83 | 0 | 0 |

Examples 31-34

A number of plaques were made for testing. In a plastic bag, a white mineral oil was added to crumbs prepared in the previous examples in varying amount. The oil is allowed to be absorbed and other components are added according to the formulations in Table 5 before molding forming plaques for testing. Optical properties of the plaques are also shown in Table 5. The results show that transmission and haze properties for compound formulations with the free-flowing crumbs do not vary much, whether or not dust agent is used.

TABLE 5

| Ingredient | phr | Ex. 31 0% | Ex. 32 0.3% DA1 | Ex. 33 0.5% DA1 | Ex. 34 0.7% DA1 |
|---|---|---|---|---|---|
| SBC3 | 100 | 35 | 35 | 35 | 35 |
| White mineral oil | 185 | 64.8 | 64.8 | 64.8 | 64.8 |
| Phenolic antioxidant | 0.57 | 0.20 | 0.20 | 0.20 | 0.20 |
| Transmittance | — | — | 93.7 | — | 93.4 | 92.9 |
| Haze | — | — | 1.98 | — | 4.26 | 6.55 |
| Clarity | — | — | 79.3 | — | 77.1 | 76.8 |

Examples 35-39

More crumb samples were prepared according to the general procedures in Examples 1-15 with SBC5, with and without with the addition of a Dust Agent according to the formulations in Table 6. The results show that the samples demonstrated acceptable rheology in oil gel formulations of 97 wt. % a low BTEX mineral oil, prepared by blending using a low-shear (paddle) mixer at either ambient (75° F.) or 110° F. for an hour. The effect of the dust agent is not noticeable on the effective yield stress (shear stress at 0.1 s−1 in Pa), when mixed at ambient or elevated temperature.

TABLE 6

| Examples | Wt. % DA1 | Mixing Temp.° F. | Shear Stress @ 77° F. | Shear Stress 126° F. | Viscosity @ 77° F. | Force to break |
|---|---|---|---|---|---|---|
| 35 SBC5 | 0 | 75 | 4.8 | 3.5 | 51 | 828 |
| 36 SBC5 | 0.5 | 110 | 4.3 | 3.1 | 87 | 331.2 |
| 37 SBC5 | 0 | 75 | 4.3 | 3.5 | 89 | — |
| 38 SBC5 | 0.5 | 110 | 3.8 | 2.6 | 65 | — |
| 39 SBC5 | 0.65 | — | — | — | — | 386.4 |

Example 40-45

A number of formulations were prepared according to the general procedures in Examples 1-15 with SBC4, dusted or not dusted with a Dusting Agent. Formulations and results of the cone design tests are shown in Table 7, including minimal cone openings for funnel flow and mass flow per according to ASTM D-6128-16 (Jenike Bulletin 123). The example with no dust exhibited a force to break of well above >200 lb/ft$^2$, with conical openings for funnel flow and mass flow to be unmeasurably high, reflected as infinite. Also as shown, a sensitive measurement such as the conical opening for mass correlates with the tamped density of the Dusting Agent. Example 45 requires 200 lb/ft$^2$, essentially the same as with Example 40 with no dusting.

TABLE 7

| Ex. Dust Category | Dust Tamped Density, g/L | Force to break, lb/ft$^2$ | funnel flow: conical opening, ft | mass flow: conical opening, ft | conical hopper angle for mass flow, degrees from vertical |
|---|---|---|---|---|---|
| 40 No Dust | N/A | >200 | inifinite | infinite | n.m. |
| 41 0.3% DA1 | 50 | 0 | 6.1 | 0.1 | 12 |
| 42 0.5% DA1 | 50 | 0 | 5 | 0.3 | 10 |

TABLE 7-continued

| Ex. | Dust Category | Dust Tamped Density, g/L | Force to break, lb/ft² | funnel flow: conical opening, ft | mass flow: conical opening, ft | conical hopper angle for mass flow, degrees from vertical |
|---|---|---|---|---|---|---|
| 43 | 0.3% DA2 | 60 | 0 | 4.3 | 1.7 | 12 |
| 44 | 0.5% DA2 | 60 | 0 | 5.1 | 2.4 | 10 |
| 45 | 0.4% DA3 | 100 | >200 | n.m. | n.m. | n.m. |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A free-flowing polymer composition in the form of free-flowing crumbs, the free-flowing crumbs consisting essentially of:
  (i) 0.2 to 2.0 wt. % fumed silica with a tamped density of <75 g/L, a surface area (BET, measured by nitrogen gas adsorption) of at least 200 m²/g, and a pH of 3 to 5; and
  (ii) 98.0 to 99.2 wt. % of a block copolymer selected from any of:
    a) a tetra-branched block copolymer having a molecular weight of 100,000 to 800,000 represented by the general formula $(A-B)_4X$;
    b) a triblock copolymer having a linear or a radial triblock copolymer structure A-B-A or $(A-B)_nX$, n=2 to 6, and a molecular weight of 75,000-600,000;
    c) a linear diblock copolymer having a molecular weight of 25,000 to 250,000, represented by the general formula A-B; and
    d) combinations thereof;
  wherein:
    A represents a polymer block of a mono alkenyl arene;
    B represents a polymer block of a conjugated diene; and
    X represents residues of a coupling agent;
  wherein
    the free-flowing crumbs are prepared by a method consisting essentially of:
      removing solvent from a hydrogenation process for making the block copolymer, generating a slurry,
      drying the slurry to generate crumbs, and
      dusting the crumbs with the fumed silica to generate the free-flowing crumbs; and
    wherein the free-flowing polymer composition requires less than 400 lbs/ft² to break in a blocking test.

2. The free-flowing polymer composition of claim 1, wherein the fumed silica is hydrophilic.

3. The free-flowing polymer composition of claim 1, wherein the block copolymer is a triblock copolymer having a coupled structure represented by the general formula $(A-B)_2X$, and a molecular weight of 50,000 to 400,000.

4. The free-flowing polymer composition of claim 1, wherein the block copolymer is a triblock copolymer, which comprises:
  one block of a monovinylaromatic hydrocarbon and one block of a conjugated diene having a styrene equivalent peak molecular weight from 80,000 g/mole to 250,000 g/mole,

TABLE 1

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SBC4 | 99.6 | 99.5 | 99.4 | — | — | — | — | — | — | — | — | — | — | — | — |
| SBC3 | — | — | — | 99.5 | 99.5 | — | — | — | — | — | — | — | — | — | — |
| SBC1 | — | — | — | — | — | — | — | — | — | — | 100 | 99.8 | 99.6 | 99.5 | 99.4 |
| SBC2 | — | — | — | — | — | 100 | 99.8 | 99.6 | 99.5 | 99.4 | — | — | — | — | — |
| DA1 | 0.4 | 0.5 | 0.6 | 0.5 | — | — | 0.2 | 0.4 | 0.5 | 0.6 | 0 | 0.2 | 0.4 | 0.5 | 0.6 |
| DA2 | — | — | — | — | 0.5 | — | — | — | — | — | — | — | — | — | — |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Force lbs/ft2 | 0 | 0 | 0 | 0 | 0 | 772.8 | 110.4 | 0 | 0 | 0 | 386.4 | 55.2 | 0 | 0 | 0 | a vinyl content from 5 to 80 mol % based on the number of repeat monomer units in the conjugated diene block, and a polystyrene content from 20 w % to 55 w %.

5. The free-flowing polymer composition of claim 1, wherein the block copolymer is a triblock copolymer having a linear structure which comprises:
   at least two blocks of monovinylaromatic hydrocarbon and at least one block of conjugated diene,
   a styrene equivalent peak molecular weight that is 70,000 g/mole to 500,000 g/mole,
   a vinyl content from 5 to 80 mole percent based on the number of repeat monomer units in the conjugated diene block,
   a polystyrene content from 10% to 40%, and
   the triblock copolymer has a melt index from <1 g/10 min. to 5 g/10 min. as determined by ASTM D-1238, condition G (200° C., 5 kg) (lower limit 0.1 g/10 m).

6. The free-flowing polymer composition of claim 1, wherein the block copolymer is a triblock copolymer having a radial structure $(A-B)_nX$, where n=2, and
   wherein the triblock copolymer having the radial structure $(A-B)_2X$ has a styrene equivalent peak molecular weight of 1.5 to 2.5 times the styrene equivalent peak molecular weight of a diblock copolymer having a general formula A-B.

7. The free-flowing polymer composition of claim 1, wherein the block copolymer is selectively hydrogenated.

8. The free-flowing polymer composition of claim 1, wherein the composition is characterized as having a conical opening of less than 10 ft in a funnel flow test.

9. The free-flowing polymer composition of claim 1, wherein the composition is characterized as having a conical opening of less than 3 ft. in a mass flow test.

10. The free-flowing polymer composition of claim 1, wherein the composition is characterized as having a conical hopper angle of less than 15 degrees from vertical in a mass flow test.

11. The free-flowing polymer composition of claim 1, wherein the composition requires less than 300 lbs/ft$^2$ to break in a blocking test.

12. The free-flowing polymer composition of claim 1, wherein the fumed silica has a BET surface area in the range of 275-450 m$^2$/g and a pH of 3.4 to 4.5 and tamped density of <75 g/L.

13. A melt formed or molded article comprising the free-flowing polymer composition of claim 1.

14. The article of claim 13, with <20% haze.

15. An oil gel comprising the free-flowing polymer composition of claim 1.

16. An oil gel according to claim 15, wherein the oil gel comprises 3-15 wt. % of the free-flowing composition based on 100 wt. % total composition of the oil gel, and wherein the oil gel has a shear stress at 77° F. of at least 3.

17. A method for making a free-flowing polymer composition in the form of free-flowing crumbs, the free-flowing crumbs consisting essentially of:
   removing solvent from a hydrogenation process for making a block copolymer, generating a slurry,
   drying the slurry to generate crumbs, and
   blending the crumbs with:
   0.05 to 2 wt. % of a fumed silica with a surface area (BET, measured by nitrogen gas adsorption) of at least 200 m$^2$/g, and a pH of 3 to 5 and tamped density of <75 g/L;
   wherein the block copolymer is selected from any of:
      a) a tetra-branched block copolymer having a molecular weight of 100,000 to 800,000 represented by the general formula $(A-B)_4X$;
      b) a triblock copolymer having a linear or a radial triblock copolymer structure A-B-A or $(AB)_nX$, and a molecular weight of 75,000 to 600,000;
      c) a linear diblock copolymer having a molecular weight of 25,000 to 250,000 represented by the general formula A-B; and
      d) combinations thereof;
   wherein:
      n=2 to 6;
      A represents a polymer block of a mono alkenyl arene;
      B represents a polymer block of a conjugated diene; and
      X represents residues of a coupling agent;
   wherein the block copolymer is present in an amount of 98.0 to 99.2 wt. % of the polymer composition; and
   wherein the free-flowing polymer composition requires less than 400 lbs/ft$^2$ to break in a blocking test.

18. The method of claim 17, wherein the fumed silica is hydrophilic.

19. The method of claim 17, wherein the block copolymer is a triblock copolymer having a coupled structure represented by the general formula $(A-B)_2X$, and a molecular weight of 50,000 to 400,000.

20. The method of claim 17, wherein the fumed silica has a BET surface area in the range of 275-450 m$^2$/g and a pH of 3.4 to 4.5 and tamped density of <75 g/L.

* * * * *